July 25, 1933.  J. L. ANDERSON  1,919,764
CUTTING TORCH
Original Filed Dec. 13, 1930
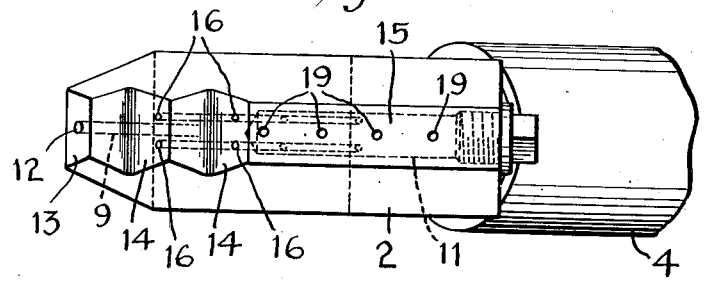
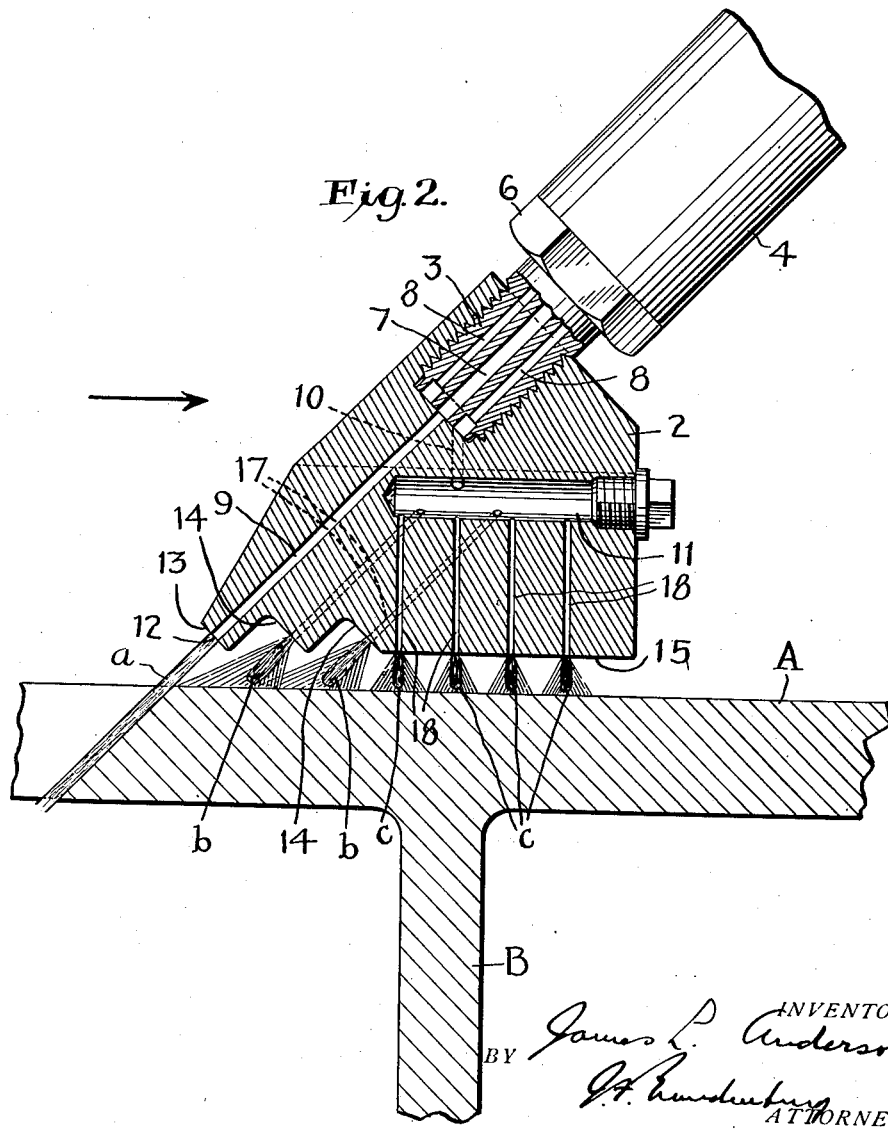

Patented July 25, 1933

1,919,764

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

CUTTING TORCH

Original application filed December 13, 1930, Serial No. 502,026. Divided and this application filed February 11, 1932. Serial No. 592,347.

The invention relates to oxyacetylene and like cutting torches and more especially to the class of machine cutting torches, which are adapted to cooperate with mechanism for supporting the torch in definite relation to the work and for moving one or the other at even speed to advance the cut.

The object of the invention is to provide a torch of this character embodying novel and advantageous features of construction and relation, which, in conjunction with each other, or certain of which used in conjunction with modifications of other features or with features of more customary character, greatly facilitate various cutting operations.

Among the objects and advantages of the invention, are high cutting speeds, the stability to cut successfully notwithstanding conditions that would otherwise present serious difficulty, the possibility of cutting greater thicknesses of metal for a given consumption of cutting oxygen, the cleanness and smoothness of the cuts, the very effective manner of preheating the metal to prepare it for the attack of the oxygen stream, the deoxidation of the surface in advance of the breast of the cut and the loosening of scale so that the cutting oxygen is enabled to act more readily on the metal, the possibility of commencing a cut in running start or in continuous motion, the insurance of completing the cut at the side of a piece of work where the relative displacement carries the cutting stream away from the object, and the facility with which metal pieces can be notched or cut part way through at exceptionally high speeds of linear displacement, when that is desired.

Embodiments of the invention are applicable to the cutting of plate or other material of uniform thickness, to the cutting of material of non-uniform thickness or the cutting of metal parts having webs, flanges or other depth portions on the obverse side, or to the cutting of work having discontinuities, or to cutting across bars or other pieces which are separated from each other.

The embodiment of the invention which is illustrated is well adapted for the cutting of parts having webs or other extensions from the side away from the surface against which the preheating and cutting jets are directed. Mechanical cutting of parts of this character has presented a problem, and a special object of the invention is to provide a cutting device capable of doing this work successfully and expeditiously. The invention is not limited, however, to this form of application.

In the accompanying drawing, forming part hereof:

Fig. 1 is a bottom plan view of a cutting torch constituting the illustrative embodiment, the stock of the torch being broken away; and Fig. 2 is a view principally in section, which may be termed for convenience a vertical section, the stock of the torch being shown in elevation, and the use of the torch to cut a plate-like section having a flange or web on the obverse side being represented.

The illustrated torch tip comprises a block 2 which is elongated in the direction of cutting movement. A shank 3 fixed in a socket of this block conducts the gases to the passages of the block. The shank may be applied to the stock 4 by a coupling nut 6. The stock of the torch is adapted to be held in a holder, which is not shown, and either the torch holder or the work A may be understood as being supported by a carriage propelled mechanically or by motor. The arrow indicates the direction of movement as referred to the torch.

A passage 7 conducts cutting oxygen under high pressure to the tip, and another passage or passages 8 supply preheating mixture, consisting of oxygen and fuel gas, preferably acetylene. The connections for receiving the gases from sources and the mixer for preparing the preheating mixture are not shown, since these matters are well known.

The passage 7 communicates with a cutting oxygen passage 9 in the tip block, and the passage or passages 8 communicate, by way of one or more passages 10, with a longitudinal manifold chamber 11 in the block, this chamber lying in front of the cutting oxygen passage and having no communication therewith.

The cutting oxygen passage 9 ranges at a downward and rearward inclination, in the rear end portion of the block. For the particular purposes for which this embodiment of the invention was designed, the obliquity of the oxygen passage is pronounced, and an angle of approximately 45° is shown, though decidedly smaller inclination, with respect to the perpendicular, may be employed. The orifice 12 of this passage opens through the face of a step 13 of the general tip face which is opposed to the work and which is seen in plan in Fig. 1.

In front of the step 13, there are other steps 14, the faces of the steps 13 and 14 being substantially at right angles to the passages which open through them. In front of the step the part 15 of the orifice face of the tip block is preferably plane, though this may be varied. In each of the steps 14 there are two transversely spaced preheating orifices 16, being the outlets of oblique preheating passages 17 which intersect the manifold chamber 11. These preheating passages also preferably extend downward and rearward at decided inclinations. As illustrated they are parallel with the oxygen passage 9, that is to say at an inclination of about 45°, but this is not essential, and steeper angles may be used.

A series of preheating passages 18 extend downward more or less perpendicularly from the chamber 11, the orifices 19 of this single file of passages opening through the face portion 15, in advance of the orifices 16 of the transversely spaced group. Certain of the passages 18 pass between the pairs of passages 17. Thus, in the preferred form of the invention there is a cutting passage delivering its oxidizing jet *a* at the rear end of the tip, a group of preheating passages delivering flame jets *b* at opposite sides of the center line and in front of the cutting jet though not in line therewith, this region of heating extending for a substantial distance ahead of the oxygen jet, and another series of preheating passages delivering flame jets *c* in front of the jets *b* and extending the heating for a further distance in advance, the jets *c* being preferably in alinement with the oxygen stream.

The piece to be cut may be an H-beam or other section having a web or flange B at the side remote from the surface over which the torch travels. Any part of this general character would ordinarily be difficult to cut, or impossible to cut so as to produce a substantially even surface. In former machine cutting torches, the cutting passage has been either perpendicular or at a forward inclination, which would result in a pocketing and excavating action when the oxygen jet reached the web or other depth extension.

The present invention overcomes this difficulty and also provides a system of preheating which is of great assistance in performing cutting operations of a difficult nature, and in securing high speeds of cutting. The rearwardly inclined oxygen passage causes the cutting stream to cut smoothly through the main plate portion of the section and through the adjoining portion of the web B, leaving the remainder, if any, of the web to be severed by a subsequent operation.

The rearward inclination of the preheating passages 17 is an added assistance, and the combined action of the flame jets *b* and *c* gives an amount and kind of preheating which insures that the cut will be carried forward successfully notwithstanding the presence of depth portions, such as the web B.

A torch as illustrated is equally applicable to the cutting of metal containing cracks or fissures which ordinarily interfere with the propagation of the reaction between the oxygen and the iron, or to the cutting of a series of spaced bars or the like, in continuous, uninterrupted relative motion between the torch and the work. Usually, in starting a cut at the front side or edge of the work, the preheating jets are applied until the metal is sufficiently hot, then the cutting oxygen is turned on, and, when the cut is initiated, the movement of the torch or of the work is started. With a torch such as illustrated the torch can be brought in full movement to the front side of the work, with its preheating jets burning and its oxygen stream turned on. The flame jets will pass over the piece of metal, effectively preheating it, and when the oxygen jet reaches the edge, its attack is most favorable since, being directly obliquely rearward, it first has to cut only an upper corner. The reaction thus started is readily carried through the complete thickness as the torch proceeds. At the departing side of the work there is also an advantage, in that the rearwardly inclined jet does not leave an uncut lower region as the result of "drag", as would be the case if a perpendicular cutting jet were used, for example.

Thus, without halting the motion of translation of the torch or work, the torch can cut across one piece of work, pass the gap, cut another piece, and so on, each piece being completely severed.

Torches constructed in accordance with the invention are also useful in performing various other cutting operations which are usually troublesome or not susceptible of performance with torch machines.

The invention is also applicable to the cutting of plain plates, slabs or blocks. For such purposes, the customary practice of having the oxygen jet and passage perpendicular, or even forwardly inclined, may be followed. Nor is the invention necessarily limited to the rearward inclination of the group of preheating passages 17 and their flames *b*. However, a special advantage of directing such transversely spaced preheating flames rearward toward the advancing breast of the cut is to be noted. The envelope gases of these flames consist of hydrogen and carbon monoxide, of which hydrogen particularly is an aid in cutting. At the outer sides of the flames, the oxygen of the atmosphere has access and consumes the gases, but between the pairs of flames air has less opportunity to enter and there is consequently an ample, continuously replenished reservoir of such unconsumed gases, which are swept rearward to the cut and there are drawn down into the kerf by the high velocity oxygen stream, largely to the exclusion of air containing inert nitrogen. This aids in making greater depths of cut in proportion to the size of the cutting oxygen stream and the pressure on the stream, and makes possible smoother cuts.

Furthermore, the actively reducing, unburned gases trapped between the transversely spaced flame jets deoxidize the surface of the metal directly in line with the cut, and any scale is loosened and caused to arch up or flake away. These effects help the oxygen jet materially.

The radiant heat between the pairs of jets *b* heats the metal directly in advance of the kerf, and the heat directly conveyed to the metal at opposite sides of the center line is conducted inward to the center. The heat supplied by the jets *b* in one or more of these ways augments the heat already put into the metal by the jets *c* which are disposed in line with the kerf. The effect of first directly heating the metal along the projected line of severance and then at regions spaced transversely away from the line is to make the preheating more effective and to carry it to greater depth for a given consumption of oxyacetylene or other mixture, the result being to increase the speed of cutting as well as to promote cleanness of cutting. Nevertheless the spacing of jets, such as the jets *b*, away from the center line need not be employed in all cases, nor need such jets be rearwardly inclined in all instances. Furthermore, the effect of rearwardly inclining preheating jets to drive hydrogen gases to the advancing kerf, may be realized to greater or less extent whether such jets are transversely spaced or not.

The transversely spaced flame jets *b* do not cause the torch to cut a wider kerf. With any given diameter of cutting jet, faster cutting speeds produce narrower cuts. The increased heat added to the metal by the flame jets *b* makes it possible to cut at higher speed, which compensates for any effect of the additional heat to cause a wider cut.

Mention has been made of the utility of the invention for "notching." In order to secure maximum speeds and economy of gases it is sometimes desired to cut metal part way through, after which it is broken, or it may be desirable to cut slotted grooves for other reasons. With the rearwardly inclined oxygen jet, as shown, and suitable preheating, such operations can be accomplished very advantageously, without undercutting or excavating the sides of the grooves and without throwing large amounts of slag and oxide up against the torch.

It will be evident that the torch is susceptible of modification in various particulars, and that different kinds of operations may be performed with torches embodying one or more features of the invention.

This application is a division of my application Serial No. 502,026, filed Dec. 13, 1930.

I claim:

1. A cutting tip comprising a block having an oxygen passage, preheating passages in front of said oxygen passage and spaced transversely with respect to the tip face, and advance preheating means disposed in central alinement with the oxygen passage.

2. A cutting tip comprising a block having an oxygen passage, a group of preheating passages in front of said oxygen passage and spaced transversely with respect to the tip face, and a file of preheating passages the orifices of which are disposed in central series extending forward from the region of said group.

3. A cutting tip comprising a block having an oxygen passage, a plurality of pairs of preheating passages in front of said oxygen passage and spaced transversely with respect to the tip face, and means for delivering preheating flame in front of the orifices of said pairs and in central alinement with the oxygen passage.

4. A cutting tip comprising a block having an oxygen passage, preheating passages in front of said oxygen passage and spaced transversely with respect to the tip face, said transversely spaced preheating passages being inclined rearward, and other preheating passages to provide a central line of flame extending in advance of the orifices of said transversely spaced passages.

5. A cutting tip comprising a block having an oxygen passage, preheating passages in front of said oxygen passage and spaced transversely with respect to the tip face, said transversely spaced preheating passages being inclined rearward, and a central advance file of preheating passages disposed to deliver their flame jets substantially perpendicularly.

6. A cutting tip comprising a block having an oxygen passage which is inclined rearward, preheating passages in front of said oxygen passage and spaced transversely with respect to the tip face and also inclined rearward, and other preheating passages to provide a central line of flame ahead of the orifices of the transversely spaced passages.

7. A cutting tip comprising a block having an oxygen passage which is inclined rearward, preheating passages in front of said oxygen passage and spaced transversely with respect to the tip face and also inclined rearward, and a central file of preheating passages disposed to deliver their flame jets substantially perpendicularly ahead of the jets from the transversely spaced and rearwardly inclined preheating passages.

8. A cutting tip comprising a block having an elongated orifice face, an oxygen passage disposed to deliver its oxidizing jet at a rearward inclination to such face and to the face of the work, and preheating passages to deliver flame jets from said face to form an extended zone of heating in front of the oxidizing jet.

9. A cutting tip comprising a block having an oxygen passage which is inclined rearward to deliver its oxidizing jet at a rearward inclination to the tip face and the work, and preheating passages in front of said oxygen passage.

10. A cutting tip comprising a block having an oxygen passage which is inclined rearward to deliver its oxidizing jet at a rearward inclination to the tip face and the work, and preheating passages in front of said oxygen passage including passages spaced longitudinally and passages spaced transversely with respect to the tip face.

11. A cutting tip comprising a block having an oxygen passage which is inclined rearward to deliver its oxidizing jet at a rearward inclination to the tip face and the work, and preheating passages in front of said oxygen passage including passages spaced longitudinally and passages spaced transversely with respect to the tip face, said preheating passages being likewise inclined rearward.

12. A cutting tip comprising a block having an oxygen passage, and a plurality of preheating passages at different distances ahead of the oxygen passage to provide a zone of heating extending ahead of the oxygen passage, the preheating jet passages which are adjacent the oxygen passage being inclined rearward with respect to the tip face and the work.

13. A cutting tip comprising a block having an oxygen passage, and a plurality of preheating passages arranged to provide a zone of heating extending ahead of the oxygen passage, the preheating jet passages which are adjacent the oxygen passage being inclined rearward and those in advance being substantially perpendicular.

14. A cutting tip comprising an elongated block having an oxygen passage, and a plurality of pairs of preheating passages in front of said oxygen passage and spaced transversely with respect to the tip face, said preheating passages being inclined rearward, so that a copious supply of gases rich in hydrogen is directed to and drawn down into the advancing cut.

15. A cutting tip comprising a block having an oxygen passage, a longitudinal manifold chamber in front of said oxygen passage, means for supplying said chamber with a preheating mixture, a plurality of preheating passages extending obliquely rearward from said chamber toward the orifice of the oxygen passage, and more advanced preheating passages extending in different angular relation from said chamber.

16. A cutting tip comprising a block having an oxygen passage, a longitudinal manifold chamber in front of said oxygen passage, means for supplying said chamber with a preheating mixture, a plurality of preheating passages extending obliquely downward from said chamber toward the orifice of the oxygen passage, and more advanced preheating passages extending in different angular relation from said chamber, certain of the latter preheating passages passing between pairs of the other preheating passages.

17. A cutting tip comprising an elongated block having an oxygen passage, and numerous preheating passages providing a collection of flame orifices extending forward from the oxygen orifice, the preheating orifices in front of the oxygen orifice being grouped at opposite sides of the longitudinal center line of the block so as to provide a copious supply of gases rich in hydrogen to be drawn into the cut by the oxygen jet.

18. A cutting tip comprising a block having an oxygen passage and a longitudinally extended collection of preheating passages in front of the oxygen passage, the preheating passages toward the front being disposed to apply the direct heat of their jets to the work along the line to be cut, and those preheating passages more toward the rear being disposed to apply the direct heating of their jets at opposite sides of the line.

JAMES L. ANDERSON.